SOLAR CELLS WITH FLEXIBLE OVERLAPPING BIFURCATED CONNECTOR

Filed Feb. 4, 1966

Wilfred R. Baron,
INVENTOR.
BY.

AGENT.

United States Patent Office 3,459,597
Patented Aug. 5, 1969

3,459,597
SOLAR CELLS WITH FLEXIBLE OVERLAPPING BIFURCATED CONNECTOR

Wilfred R. Baron, Palos Verdes Peninsula, Calif., assignor to TRW Inc., Redondo Beach, Calif., a corporation of Ohio Filed Feb. 4, 1966, Ser. No. 525,096
Int. Cl. H01l 15/04
U.S. Cl. 136—89 4 Claims

ABSTRACT OF THE DISCLOSURE

A bifurcated clip having the desired thickness and strength is located at the junction of solar cells for mechanically maintaining series cells in an overlapping relationship with respect to each other and adjacent cells. The clip not only mechanically supports overlapping series cells with adjacent cells but also electrically interconnects mechanically supported cells with each other. Each clip has an expension joint in a series direction and in a transverse direction thereby providing flexibility in fitting the solar cell module to a complex arcuate form.

The invention described herein was made in the performance of work under a National Aeronautics and Space Administration contract and is subject to the provisions of Section 305 of the National Aeronautics and Space Act of 1958, Public Law 85–568 (72 Stat. 435; 42 U.S.C. 2457).

This invention relates to a flexible solar cell module and more particularly to an improved arrangement for maintaining overlapping solar cells in a contacting relationship whereby the solar cells forming the module are adaptable to fit either curved or straight surfaces.

The prior art has recognized the advantages to be obtained from overlapping solar cells. The Dickson Patent 2,938,938 and the Nielsen Patent 3,116,171, are prime examples illustrating the physical bonding of overlapped solar cells and how these overlapped solar cells may be bonded together to form a solar cell module. The conventional solar cell has a first surface primarily adapted to receive incident radiated energy from the sun for conversion to electrical energy. A small portion of the surface is reserved for electrical contacting purposes and hence does not serve a useful purpose for converting radiated energy to electrical energy. The complete bottom most surface of the solar cell forms the second electrical surface of the cell. In forming an overlapped solar cell module, the portion of the bottom-most surface of one cell is bonded to the contacting strip located on the top surface of a second cell to thereby connect the two cells in series. By overlapping the two cells, it is possible to place a greater surface of the solar cell facing the radiated energy for conversion to electrical energy. Unfortunately, directly bonding cells together as shown in the prior art has created thermal and mechanical expansion problems. The unequal expansion of one cell in a series string of overlapped cells will cause a breakage and the loss of electrical power from that string. Attempts have been made to solve the problem by controlling the quality of the individual cells to make them as uniform as possible and by creating complicated holding mechanisms, as evidenced by the Nielsen patent, for allowing the complete module to move relative to its holding mechanism.

The prior art techniques have not solved the basic problem which is caused by the fixed bonding of each overlapped cell to the next cell.

In the present invention, the aforementioned problems have been solved by eliminating the fixed and direct bonding of one cell to the next cell in the overlapped string.

The advantages and benefits of the overlapped cells are maintained by means of an interconnector located intermediate the overlapped cells. The interconnector is a substantially rigid member serving the double purpose of electrically connecting the top contacting surface of a first cell with the bottom contacting surface of a second overlapping cell while, at the same time, maintaining the two cells in the defined overlapping and noncontacting position. Added flexibility in the module is obtained by having a thermal expansion means in each interconnector. A string of cells constructed with the defined interconnector will adapt to any arcuate or straight surface since the individual cells are not directly bonded to each other. Thermal expansion between cells is provided by the expansion means forming part of the interconnector. In the preferred embodiment, a solar cell module may be constructed in both series and in a parallel direction, to thereby form a redundant solar cell package as required by the art today.

Further objects and advantages of the present invention will be made more apparent by referring now to the accompanying drawings wherein.

Figure 4:
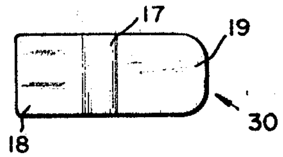
Figure 5:
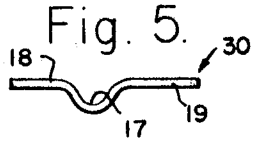
Figure 6:
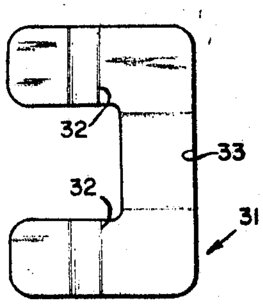
Figure 7:
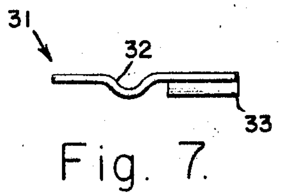

FIGS. 4 and 5 illustrate interconnectors used to electrically connect and mechanically support series cells in a noncontacting overlapping arrangement; and FIGS. 6 and 7 illustrate an interconnector for maintaining a parallel pair of series connected cells in a noncontacting overlapping arrangement and for electrically connecting and supporting the parallel strings of overlapping cells in an abutting relationship.

Figure 1:
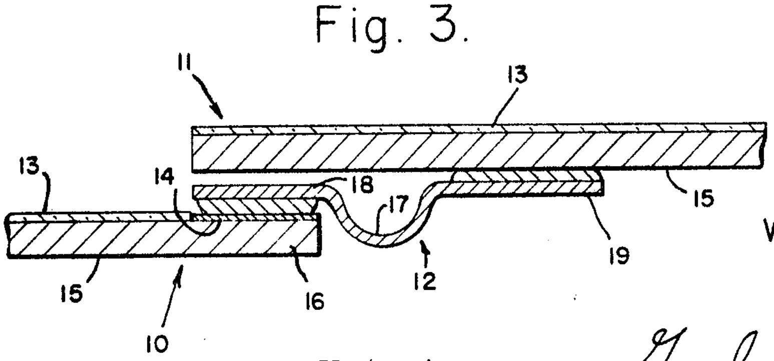
FIG. 1 is a cross-sectional view of two cells in series maintained in an overlapping noncontacting position by the defined electrical interconnector.

Referring now to FIG. 1, there is shown a pair of solar cells 10 and 11 held in a noncontacting overlapping arrangement by an electrical interconnector 12. Each of the solar cells described are substantially identical and comprise a top surface responsive to radiation energy and protected by means of a suitable cover slide 13. A portion of the top surface of the solar cell comprises an electrically conductive portion 14 forming a first contacting surface. The bottom surface of the solar cell forms a second electrical contacting surface 15. The electrical interconnector 12 is formed with a curve portion 17 bowed to allow thermal expansion between cells in the series direction. A substantially straight portion 18 of the electrical interconnector 12 is bonded to the first contacting surface 14 of solar cell 10 and preferably by means of a conventional solder joint. An end 19 of the electrical interconnector 12 is bonded to the bottom surface 15 forming the second electrical contact of the solar cell 11. The end 19 is preferably soldered to solar cell 11 which is located in an overlapping position with respect to solar cell 10 such that one end of cell 11 covers the end 18 of the interconnector 12. Since the bottom portion 15 of the solar cell 11 forms an electrical contacting surface, it is possible to solder the end 19 at any point on the cell which in this case is determined solely by the desired geometry. As mentioned previously, the electrical interconnector 12 is a separate unitary structure capable of physically supporting the two cells in the defined noncontacting overlapping relationship. The expansion loop 17 not only provides for thermal expansion between series solar cells, but also allows another degree of freedom in forming the solar cell module about an arcuate surface. The necessary compression and tension that occurs when forming the module to an arcuate surface takes place at the loop 17.

Figure 2:
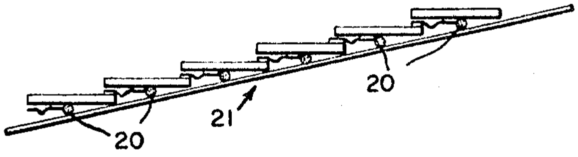
FIG. 2 illustrates a series string of overlapping solar cells connected in series.

FIG. 2 illustrates a string of series solar cells held in a noncontacting overlapping relationship by means of the defined interconnectors. Surface 20 may be a solar paddle, panel or the surface of a satellite illustrating how the individual solar cells are supported when placed in the overlapping portion. Surface 20 may represent a solar cell panel of the type currently used in space exploration vehicles. While the surface 20 is drawn in a linear fashion, it is possible for it to be arcuate and for the individual solar cells to conform to the curve. Complete flexibility and independence of movement between solar cells and the supporting surface 20 is obtained by means of adhesive 21 used to connect each of the individual solar cells to the surface 20.

Figure 3:
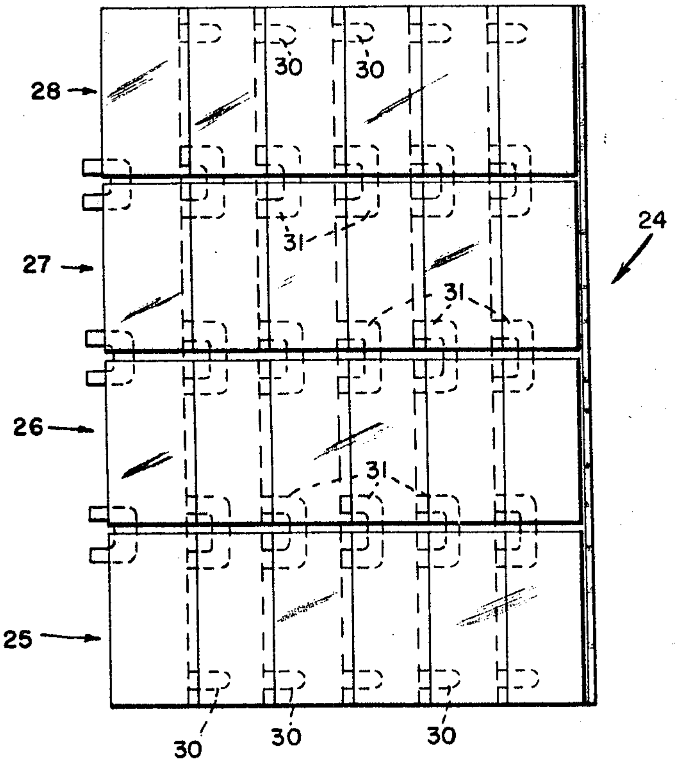
FIG. 3 illustrates a solar cell module comprising four series strings of solar cells, connected in parallel.

Referring now to FIG. 3, there is shown a solar cell module 24 comprised of four strings 25, 26, 27 and 28 of overlapping, noncontacting solar cells constructed as shown in FIG. 1. All four strings are substantially identical with each other and placed in an abutting relationship whereby strings 25 and 26, 26 and 27, and 27 and 28 abut each other. FIG. 3 illustrates the solar cell module from the top side defined as that side of the module which normally faces the source of radiated energy. In string 25, interconnector 30 is basically of the type illustrated in FIGS. 1 and 2 which provides electrical interconnection between the top of one cell and the bottom of a following cell while at the same time maintaining the noncontacting overlapping relationship. A plan view and side view of interconnector 30 is shown in connection with FIGS. 4 and 5. Located between any two strings of overlapping cells, for example, strings 25 and 26, is a U-shaped single interconnector 31 which performs the same individual functions as interconnector 30 but does so for both strings 25 and 26 and also electrically and mechanically interconnects both strings. Interconnector 31 is bifuracted so as to not only provide the overlapping and mechanical support for the cells of strings 25 and 26 but also to provide parallel electrical interconnection between the adjacent abutting cells. The features of the interconnector 30 are more fully shown and described in connection with FIGS. 4 and 5.

Referring now to FIGS. 4 and 5, there is shown a plan and side view of interconnector 30 also illustrated in FIG. 3. The interconnector 30 illustrated in FIGS. 4 and 5 is similar to the electrical interconnector 12 illustrated in FIG. 1. As mentioned previously, the interconnector 30 is used only for establishing a series electrical and mechanical connection between overlapping cells. In the actual embodiment as shown in FIG. 3, the interconnector 30 is used only on the end portion of a complete solar cell module as shown in string 25 and string 28.

Referring now to FIGS. 6 and 7, there is shown a bifurcated interconnector 31 used to join abutting strings of series connected overlapping solar cells. The interconnector 31 is functionally similar to two separate interconnectors 30 connected together. Each half of the bifurcated interconnector 31 contains a loop 32 which allows for expansion in the series direction of the overlapping solar cells in a manner as described in connection with FIGS. 1 and 4. Both halves of the bifurcated interconnector 31 are joined together by loop 33 which provides the dual function of electrically interconnecting and supporting the bifurcated halves and also provides for thermal expansion in the parallel direction. The electrical interconnectors 31 are substantially rigid compared to the mass of the solar cells and hence it is possible for a plurality of the individual electrical interconnectors to support and maintain the structural integrity of a complete solar cell module as shown in FIG. 3.

One of the unobvious advantages resulting from the present invention is that a backing or substrate material usually needed to give structural support to the individual solar cell modules is not needed or required in the practice of this invention. The individual interconnectors 31 shown in FIGS. 6 and 7 perform the electrical interconnecting functions as well as provide the mechanical strength for maintaining the mechanical integrity of the solar cell module. Flexibility is obtained in both the series and the parallel direction by means of the expansion loops 32 and 33 which are part of each interconnector 31. The individual solar modules as shown in FIG. 3 are therefore capable of being formed to any desired surface whether it be arcuate or straight.

This invention is not limited to the particular details of construction, materials and processes described as many equivalents will suggest themselves to those skilled in the art. It is, accordingly, desired that the appended claims be given a broad interpretation commensurate with the scope of the invention within the art.

What is claimed is:

1. A solar cell module comprising at least two parallel strings of series overlapping solar cells adjacent to each other,
   - each of said cells having a top surface responsive to a source of radiation, a portion of said top surface being electrically conductive thereby forming the first contacting surface,
   - said solar cells each having a bottom electrically conductive surface forming a second contacting surface,
   - and a substantially U-shaped bifurcated interconnector located only at the corner intersection of the two parallel adjacent cells and the two series overlapping cells,
   - said interconnector having a base portion electrically bonded to each of the second contacting surfaces of said parallel adjacent cells,
   - each bifurcated leg portion of said interconnector bonded to the first contacting surface of the series overlapping cell for maintaining a noncontacting overlapping relationship between series cells in each string.

2. A combination according to claim 1 in which each of said electrical interconnectors is a substantially rigid structure adapted to maintain the structural integrity of said solar cell module.

3. A combination according to claim 1 in which each of said electrical interconnectors contains an expansion joint for relieving thermal stresses and also for providing flexibiilty in fitting the solar cell module to an arcuate form.

4. A combination according to claim 1 in which each of said electrical interconnectors contains an expansion joint in the parallel direction and an expansion joint in the series direction for relieving thermal stresses and also for providing flexibility in fitting the solar cell module to a complex arcuate form.

References Cited

UNITED STATES PATENTS 3,340,096 9/1967 Mann et al. ---------- 136—89
3,346,419 10/1967 Webb -------------- 136—89

FOREIGN PATENTS 1,373,773 10/1964 France.

ALLEN B. CURTIS, Primary Examiner